United States Patent Office 3,718,195
Patented Feb. 27, 1973

3,718,195
CORE DRILLING WITH AIR CONTAINING POLYMER IN OIL
Frank H. Clements, Andrews, Tex., assignor to Amoco Production Company, Tulsa, Okla.
No Drawing. Filed Oct. 26, 1971, Ser. No. 192,482
Int. Cl. E21b 49/02
U.S. Cl. 175—58   3 Claims

ABSTRACT OF THE DISCLOSURE

Polyisobutylene in oil is added to a gas circulated through a well during core-drilling operations. The polymer prevents jerking of the core barrel and the resulting core breakage and loss, which occurs when oil without the polymer is used.

---

In core-drilling operations, a gas, such as methane, or air, is sometimes circulated through the well as a drilling fluid to sweep out bit cuttings. A little liquid, such as water, is generally added to the air. It has been found that water works well as long as the amount is small. It has also been found, however, that the water changes the water saturation of the cores. Since determination of water saturation is frequently one of the principal reasons for taking the core, water obviously should not be added to the gas in such cases.

Substitution of oil for water has not been satisfactory. The principal reason is that the oil causes high torque and a jerking action of the core barrel. Cores are broken and jam the core barrel. In addition, core recovery is poor. The reason for the poor action with oil is not known.

With the above problems in mind, an object of this invention is to provides an improved method for core drilling while circulating gas. A more specific object is to provide such a method in which the liquid can be added to the air while avoiding changing the water saturation of the cores, which occurs when water is used, and avoiding the high torque and jerking core barrel, which occur when oil is used. Still other objects will be apparent from the following description and claims.

SUMMARY OF THE INVENTION

I have found that the addition of a little polyisobutylene to the oil used in core drilling with gas overcomes the high torque and jerking of the core barrel. Very good core recovery then occurs.

The explanation of the action of the polyisobutylene is not known. However, the improvement has been very apparent in field use. In one well drilled with oil, which did not contain polyisobutylene, all six cores were incomplete. The first three cores in the second well drilled in the same field in the same way were also incomplete. In drilling the bottom of the second well and thirteen other wells in the same field, 63 cores were taken with oil containing polyisobutylene added to the circulated gas. Only four of these 63 cores were incomplete. Two incomplete cores were due to drilling head failures and the other two did not appear to be due to the nature of the oil and the circulated gas. The successful action of the polyisobutylene is therefore very definite.

The polyisobutylene is approximately the same as that described in U.S. Patent 3,215,154 White et al. For my purposes, lower molecular-weight polymer can be used than that suggested by White et al. For my purposes, the polymer can have an average molecular weight in the range from about 0.1 to about 15 million, and preferably from about 0.2 to about 10 million, as measured by the intrinsic viscosity method. In the wells described above, the polymer had a molecular weight of only about 250 thousand. The polymer is ordinarily available in a concentrated solution in kerosene. This concentrated solution contains about one-quarter pound of polymer per U.S. gallon of kerosene. The kerosene solution is generally used for other purposes, such as reducing flowing friction in hydraulic fracturing of earth formations, or reducing flowing friction while circulating an oil-base drilling fluid in a well.

About one to about six, and, preferably, about two gallons of the concentrated kerosene solution should be used in one thousand gallons of oil to form a dilute polymer solution. This dilute solution is then added to the gas circulated in the well. In the dilute solution, the concentration of polyisobutylene is only about 0.00025 to about 0.0015 pound per gallon. The dilute oil solution should be added to the circulated gas at a rate of about one to about ten gallons of the dilute solution, and, preferably, about four or five gallons to each 1,000 cubic feet of gas, the volume of gas being measured at the pressure at which it enters the well.

The dilute solution of polymer may be sprayed into the air stream going down the well. However, the high-velocity flow of the air is generally sufficient to disperse the oil, even if it is introduced without the aid of a spray nozzle.

The oil used to prepare the dilute polymer solution may be an available crude petroleum oil. A refined petroleum fraction, such as kerosene, may also be used. Oils, having viscosities above about 100 centipoises, should be avoided.

Process steps can be those ordinarily used for drilling wells and taking cores in a bottomhole core barrel while circulating a gas. The direction of circulation can be down the drill pipe and up the annular space around the drill pipe, or it can be reverse circulation down the annular space and up inside the drillpipe. Most experience has been with reverse circulation, so this is preferred.

The process steps and materials described above are given by way of example. Equivalents and alternates will be apparent to those skilled in the art. Therefore, I do not wish to be limited to the described examples, but only by the following claims.

I claim:

1. In a process for drilling a well and obtaining cores in a core barrel at the bottom of the well while circulating a gas in said well, in which process oil is added at the top of the well to the gas flowing down the well,
the improvement comprising adding polyisobutylene to said oil before the oil is added to the gas,
said polyisobutylene having an average molecular weight between about 0.1 million and about 15 million as determined by the intrinsic viscosity measure, the concentration of polyisobutylene in said oil being from about 0.00025 to about 0.0015 pound of polymer per U.S. gallon of oil, and from about one to about ten gallons of the polymer solution in oil being added to each 1,000 cubic feet of circulated gas, the gas volume being measured at the pressure at which it enters the well.

2. The method of claim 1 in which the direction of circulation of the gas is down the annular space outside the drill pipe and up inside the drill pipe.

3. The method of claim 1 in which the polymer has a molecular weight of about 250 thousand.

References Cited

UNITED STATES PATENTS

| | | | |
|---|---|---|---|
| 3,251,417 | 5/1966 | Holman et al. | 175—69 Y |
| 3,288,230 | 11/1966 | Braunlich et al. | 175—69 |
| 3,323,604 | 6/1967 | Henderson | 175—58 X |
| 3,419,092 | 12/1968 | Elenburg | 175—69 |

DAVID H. BROWN, Primary Examiner

U.S. Cl. X.R.

175—69